(12) United States Patent
Shigeno et al.

(10) Patent No.: US 10,161,958 B2
(45) Date of Patent: Dec. 25, 2018

(54) THREE-DIMENSIONAL FINE MOVEMENT DEVICE

(71) Applicant: Hitachi High-Tech Science Corporation, Minato-ku, Tokyo (JP)

(72) Inventors: Masatsugu Shigeno, Tokyo (JP); Kazutoshi Watanabe, Tokyo (JP); Masafumi Watanabe, Tokyo (JP)

(73) Assignee: Hitachi High-Tech Science Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/794,968

(22) Filed: Jul. 9, 2015

(65) Prior Publication Data

US 2016/0011231 A1 Jan. 14, 2016

(30) Foreign Application Priority Data

Jul. 9, 2014 (JP) .................... 2014-141057

(51) Int. Cl.
| | | |
|---|---|---|
| *G01Q 10/04* | (2010.01) | |
| *G01Q 70/04* | (2010.01) | |
| *G01Q 10/02* | (2010.01) | |
| *G01Q 20/00* | (2010.01) | |
| *G01Q 20/02* | (2010.01) | |

(52) U.S. Cl.
CPC ............. *G01Q 10/04* (2013.01); *G01Q 70/04* (2013.01); *G01Q 10/02* (2013.01); *G01Q 20/00* (2013.01); *G01Q 20/02* (2013.01)

(58) Field of Classification Search
None
See application file for complete search history.

(56) References Cited

U.S. PATENT DOCUMENTS

| | | | | |
|---|---|---|---|---|
| 5,025,658 A | * | 6/1991 | Elings | ................... B82Y 35/00 |
| | | | | 73/105 |
| 5,388,452 A | * | 2/1995 | Harp | ..................... B82Y 35/00 |
| | | | | 250/307 |
| 6,229,607 B1 | * | 5/2001 | Shirai | ................... B82Y 35/00 |
| | | | | 356/614 |

(Continued)

FOREIGN PATENT DOCUMENTS

| | | |
|---|---|---|
| JP | H06-066509 A | 3/1994 |
| JP | H06-88724 A | 3/1994 |

(Continued)

OTHER PUBLICATIONS

Nov. 23, 2015—(EP) Extended European Search Report—App 15175803.4.

(Continued)

*Primary Examiner* — Michael J Logie
(74) *Attorney, Agent, or Firm* — Banner & Witcoff, Ltd.

(57) ABSTRACT

A three-dimensional fine movement device includes a moving body, a fixation member to which the moving body is fixed, a three-dimensional fine movement unit, to which the fixation member is fixed, and which allows for three-dimensional fine movement of the moving body with the fixation member interposed therebetween, a base member to which the three-dimensional fine movement unit is fixed, and movement amount detecting means that is fixed to the base member to detect a movement amount of the fixation member.

5 Claims, 6 Drawing Sheets

(56) References Cited

U.S. PATENT DOCUMENTS

| | | | |
|---|---|---|---|
| 6,278,113 B1* | 8/2001 | Murayama | B82Y 35/00 250/442.11 |
| 6,435,015 B1 | 8/2002 | Yamamoto | |
| 6,530,268 B2 | 3/2003 | Massie | |
| 6,612,160 B2 | 9/2003 | Massie et al. | |
| 6,928,863 B2 | 8/2005 | Massie | |
| 7,333,191 B2* | 2/2008 | Murayama | B82Y 35/00 356/150 |
| 7,550,896 B1 | 6/2009 | Su | |
| 8,644,964 B2* | 2/2014 | Hendron | E02F 9/265 700/20 |
| 2001/0017696 A1* | 8/2001 | Narita | G01B 11/026 356/499 |
| 2002/0124636 A1* | 9/2002 | Massie | B82Y 35/00 73/105 |
| 2002/0125415 A1* | 9/2002 | Massie | G01B 5/28 250/234 |
| 2004/0134264 A1 | 7/2004 | Massie | |
| 2006/0097162 A1* | 5/2006 | Maruyama | G01Q 10/04 250/309 |
| 2006/0284083 A1* | 12/2006 | Kurenuma | B82Y 35/00 250/309 |
| 2007/0103697 A1* | 5/2007 | Degertekin | B82Y 35/00 356/501 |
| 2008/0236259 A1* | 10/2008 | Kurenuma | G01Q 10/065 73/105 |
| 2009/0073405 A1* | 3/2009 | Kanaya | G03F 7/70725 355/53 |
| 2009/0073457 A1* | 3/2009 | Nakata | G01B 9/02018 356/498 |
| 2009/0140142 A1* | 6/2009 | Murayama | B82Y 35/00 250/307 |
| 2011/0055982 A1* | 3/2011 | Watanabe | B82Y 35/00 850/2 |
| 2011/0203020 A1* | 8/2011 | Park | B82Y 35/00 850/2 |
| 2011/0247108 A1* | 10/2011 | Park | B82Y 35/00 850/21 |
| 2013/0212749 A1* | 8/2013 | Watanabe | G21K 7/00 850/4 |

FOREIGN PATENT DOCUMENTS

| | | | | |
|---|---|---|---|---|
| JP | H06-174460 A | | 6/1994 | |
| JP | H10-213587 A | | 8/1998 | |
| JP | 2001-135561 A | | 5/2001 | |
| JP | 2001-188035 A | | 7/2001 | |
| JP | 2008002991 A | * | 1/2008 | G01N 13/10 |
| JP | 2009-225654 A | | 10/2009 | |
| JP | WO 2012035826 A1 | * | 3/2012 | G01Q 10/04 |
| WO | 02/073125 A1 | | 9/2002 | |

OTHER PUBLICATIONS

Griffith et al; "A Scanning Tunneling Microscope with a Capacitance-Based Position Monitor", Journal of Vacuum Science and Technology; Part B, AVS/AIP, Melville, New York, NY, US, vol. 8, No. 6, Nov. 1, 1990, pp. 2023-2027.

* cited by examiner

THREE-DIMENSIONAL FINE MOVEMENT DEVICE

CROSS-REFERENCE TO RELATED APPLICATIONS

This application claims priority from Japanese Patent Application No. 2014-141057 filed on Jul. 9, 2014, the subject-matter of which is incorporated herein by reference.

TECHNICAL FIELD

The present invention relates to a three-dimensional fine movement device such as a scanning probe microscope including a mechanism which drives a stage.

BACKGROUND

A scanning probe microscope is configured to measure the surface shape of a sample by causing a probe attached to the front end of a cantilever to approach or come into contact with a sample surface. As measurement modes of the scanning probe microscope, there have been known (1) a contact mode in which the surface shape of the sample is measured while maintaining an inter-atomic force between the probe and the sample to be constant, (2) a method (hereinafter, appropriately referred to as a "dynamic force mode (DFM measurement mode)") in which the shape of the sample is measured by using the fact that the amplitude of the probe is attenuated due to intermittent contact between the probe and the sample when the probe approaches the sample by forcibly vibrating the cantilever near a resonance frequency by using a piezoelectric element, and (3) a method (hereinafter, appropriately referred to as a "non-contact mode (NC-AFM measurement mode)") in which the shape and property of the sample are measured using the fact that a resonance state of the probe is changed by a force acting between the probe and the sample when the probe approaches the sample by forcibly vibrating the cantilever near the resonance frequency by using the piezoelectric element.

The scanning probe microscope includes a fine movement unit that includes two (two-axis) fine movement mechanisms (piezoelectric elements) that respectively scan the sample in an xy (plane) direction and one (one-axis) fine movement mechanism (piezoelectric element) that scans the sample in a z (height) direction. For example, the sample is mounted on the surface of a stage disposed on the fine movement unit. Since a voltage applied to the piezoelectric element is proportional to the displacement of the piezoelectric element to some extent, height information related to the sample surface may be calculated from the voltage applied to the piezoelectric element. However, since the operational characteristics of the piezoelectric element are hysteresis or creep, it is difficult to obtain an accurate position of the piezoelectric element from the applied voltage.

Thus, a technology in which position detecting sensors using impedance are provided on the piezoelectric elements has been developed (JP-A-2009-225654). By using such a technology, it is possible to respectively detect the positions of the three (three-axis) piezoelectric elements of the fine movement unit, and it is possible to calculate a three-dimensional position of the sample disposed on the fine movement unit.

SUMMARY

Figure 6:
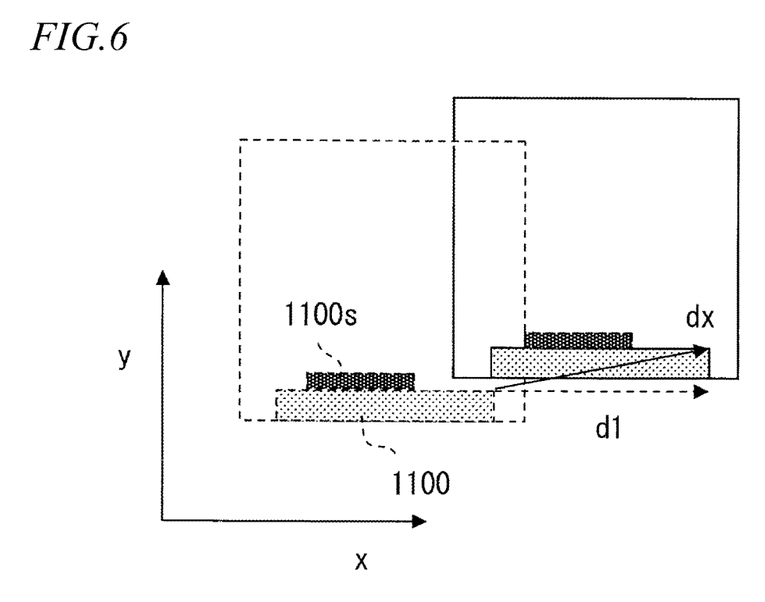
FIG. 6 is a diagram showing the displacement of a piezoelectric element of the related art.

When the three-dimensional position of the sample is calculated by using the position detecting sensors on the three-axis piezoelectric elements, the one-axis displacements that are respectively detected for the piezoelectric elements are combined in three directions. However, as shown in FIG. 6, since a piezoelectric element 1100 is slightly displaced on two perpendicular axes (for example, the y direction) as well as a movement direction (x direction), a displacement amount in the x direction measured by a position detecting sensor 1100s on the piezoelectric element 1100a is dl, and an actual displacement amount is dx obtained by combining dl with a fine displacement in the y direction. For this reason, even if the displacement amounts detected by the position detecting sensors of the three-axis piezoelectric elements are combined in the three directions, an error may occur between the actual displacement amount and the measured displacement amount.

Meanwhile, since the sample measured by the scanning probe microscope is fine in many cases, it is difficult to directly detect the position of the sample. Even if it is attempted to measure the position of the sample, since the positions of samples on the stage or the shapes of the samples are different, measurement conditions are individually different from each other, and thus, time and effort are needed to adjust the measurement condition.

Illustrative aspects of the present invention provide a three-dimensional fine movement device capable of simply and accurately measuring the position of a fixation member or a moving body by directly detecting a three-dimensional position of the fixation member to which the moving body such as a cantilever is fixed by using movement amount detecting means fixed to a coarse movement unit or a base member that relatively does not move in comparison with the fine movement of the moving body.

According to one illustrative aspect of the present invention, there may be provided a three-dimensional fine movement device comprising: a moving body; a fixation member to which the moving body is fixed; a three-dimensional fine movement unit, to which the fixation member is fixed, and which allows for three-dimensional fine movement of the moving body with the fixation member interposed therebetween; a base member to which the three-dimensional fine movement unit is fixed; and movement amount detecting means that is fixed to the base member and is configured to detect a movement amount of the fixation member.

According to the three-dimensional fine movement device, by directly detecting the three-dimensional position of the fixation member to which the moving body is fixed by using the movement amount detecting means fixed to the base member that relatively does not move in comparison with the fine movement of the moving body, it is possible to simply and accurately measure the positions of the fixation member and the moving body.

According to another illustrative aspect of the present invention, there may be provided a three-dimensional fine movement device comprising: a moving body; a fixation member to which the moving body is fixed; a three-dimensional fine movement unit, to which the fixation member is fixed, and which allows for the three-dimensional fine movement of the moving body with the fixation member interposed therebetween; a three-dimensional coarse movement unit, to which the three-dimensional fine movement unit is fixed, and which allows for coarse movement of the three-dimensional fine movement unit on at least one axis of three-dimensional axes at a movement amount greater than that of the three-dimensional fine movement unit; a base member to which the three-dimensional coarse movement unit is fixed; and movement amount detecting means that is fixed to the three-dimensional coarse movement unit and is configured to detect a movement amount of the fixation member.

According to the three-dimensional fine movement device, by directly detecting the three-dimensional position of the fixation member to which the moving body is fixed by using the movement amount detecting means fixed to the three-dimensional coarse movement unit that relatively does not move in comparison with the fine movement of the moving body, it is possible to simply and accurately measure the positions of the fixation member and the moving body.

When an object disposed on an opposite side to the moving body is mounted with the three-dimensional coarse movement unit interposed therebetween, as the object is heavy, a three-dimensional coarse movement position tends drift significantly due to the weight of the object. Thus, by attaching one axis of the three-dimensional coarse movement unit to the fixation member opposite to the object, the influence of the drifting is suppressed, and thus, it is possible to achieve three-dimensional coarse movement.

In the three-dimensional fine movement device, the movement amount detecting means may be configured to detect a detection surface of the fixation member According to the three-dimensional fine movement device, by detecting the detection surface by the movement amount detecting means for detecting a diffraction laser beam using, for example, a high-accuracy diffraction grating (volume type hologram grating) as the detection surface, it is possible to more accurately measure the position of the moving body.

A plurality the detection surfaces may be arranged on the respective axes of the three-dimensional axes, and the movement amount detecting means may be provided on the respective detection surface on the respective axes to detect the corresponding detection surfaces.

According to the three-dimensional fine movement device, by detecting the displacements of the respective three-dimensional axes by the movement amount detecting means, it is possible to more accurately measure the position of the moving body.

When the movement amount detecting means is a non-contact sensor, it is possible to more accurately measure the position of the moving body.

When the non-contact sensor is a sensor that utilizes electrostatic capacitance, optical interference, or optical diffraction, it is possible to more accurately measure the position of the moving body.

The moving body may be a cantilever that comes into contact with or approaches a sample, the three-dimensional fine movement device may further comprise a sample stage that is directly fixed to the base member or is fixed to the base member with a three-dimensional coarse movement unit or a second three-dimensional coarse movement unit interposed therebetween, and faces the cantilever, and the sample may be disposed on a surface of the sample stage.

The second three-dimensional coarse movement unit may move coarsely on an axis that is different from an axis onto which the three-dimensional coarse movement unit moves coarsely.

The moving body may be a sample, the three-dimensional fine movement device may further comprise a cantilever attachment unit that is directly or indirectly fixed to the base member, and faces the sample, and a cantilever that comes into contact with or approaches the sample may be disposed on a surface of the cantilever attachment unit.

The three-dimensional fine movement device may further comprise a control unit configured to perform control on a position on at least one axis of three-dimensional positions of the moving body through closed loop control based on the movement amount detected by the movement amount detecting means.

According to the three-dimensional fine movement device, it is possible to perform positioning with high accuracy by accurately controlling the three-dimensional position of the moving body or it is possible to measure the position of the moving body while controlling the movement amount.

According to the present invention, it is possible to simply and accurately measure the position of a fixation member or a moving body by directly detecting a three-dimensional position of the fixation member to which the moving body such as a cantilever is fixed by using movement amount detecting means fixed to a coarse movement unit or a base member that relatively does not move in comparison with the fine movement of the moving body.

DETAILED DESCRIPTION

Hereinafter, illustrative embodiments of the present invention will be described with reference to the drawings. (scanning probe microscope) 200A according to a first illustrative embodiment of the present invention, and FIG. 2 is a cross-sectional view taken along line II-II of FIG. 1.

Figure 1:
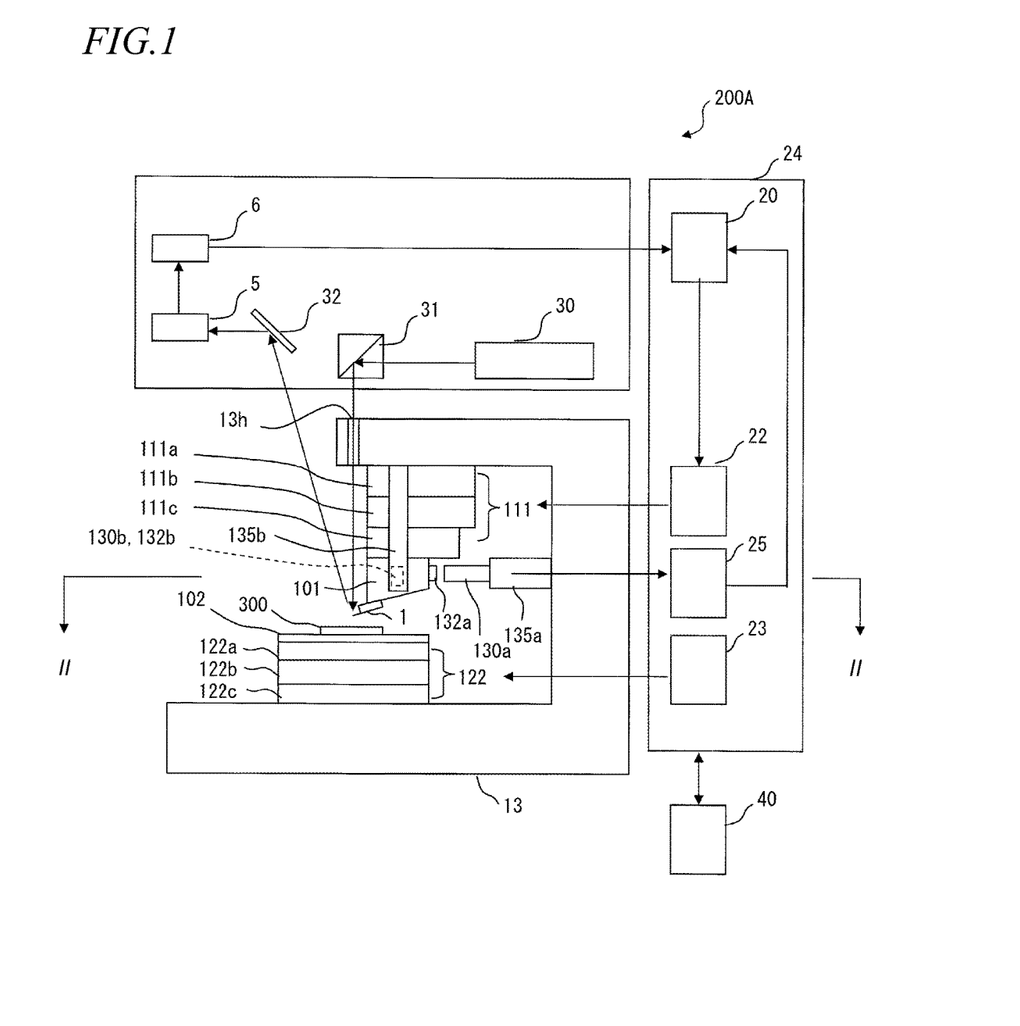
FIG. 1 is a block diagram of a three-dimensional fine movement device (scanning probe microscope) according to a first illustrative embodiment of the present invention.
Figure 2:
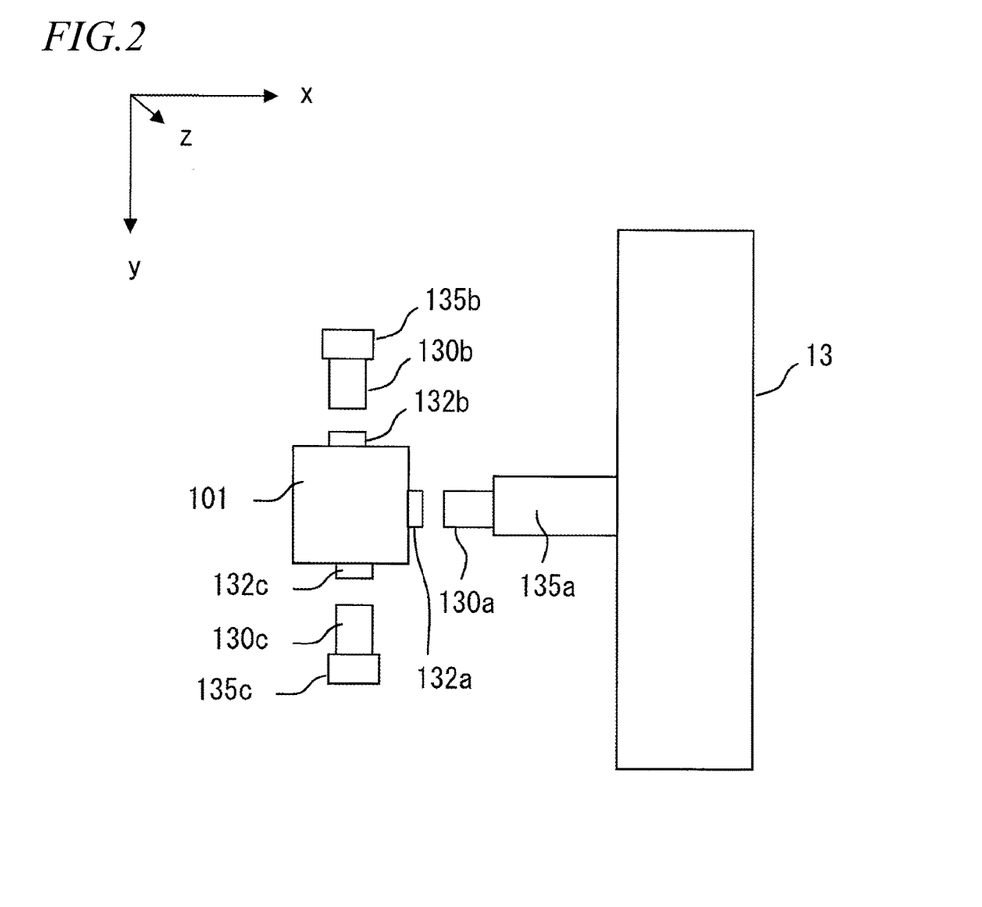
FIG. 2 is a cross-sectional view taken along line II-II of FIG. 1.

In FIG. 1, the scanning probe microscope 200A includes a cantilever 1 that holds a probe at the front end thereof, a cantilever attachment unit (inclined block) 101, a piezoelectric scanner 111, a base member 13 that forms a frame for supporting the respective components of the scanning probe microscope, a non-contact sensor 130, a detection surface 132 that receives a detection signal from the non-contact sensor 130, a three-dimensional coarse movement unit 122, a sample stage 102 that is disposed on the three-dimensional coarse movement unit 122, a probe microscope controller 24 that controls the entire microscope, and a control unit (computer) 40.

The computer 40 includes a control board for controlling the operation of the scanning probe microscope 200A, a CPU (central processing unit), a ROM, storage means such as a RAM, an interface, and an operation unit.

The cantilever 1, the cantilever attachment unit 101, the scanner 111, and the non-contact sensor 130 respectively correspond to a "moving body", a "fixation member", a "three-dimensional fine movement unit", and "movement amount detecting means" in the claims.

The base member 13 has a leftward U shape when viewed from the side, the three-dimensional coarse movement unit 122 is fixed to the upper surface of a lower member of the leftward U-shaped part, and a sample 300 is mounted in a predetermined position of the sample stage 102 disposed on the three-dimensional coarse movement unit 122.

Meanwhile, the scanner 111 is fixed to the lower surface of an upper member of the leftward U-shaped part of the leftward U-shaped base member 13, and the cantilever attachment unit 101 is fixed to the lower surface of the scanner 111. The cantilever attachment unit 101 has a substantially square pillar shape of which the front end surface is an inclined surface, and the cantilever 1 is attached to the front end surface in a cantilevered manner. The cantilever 1 faces the sample 300, and the probe of the front end of the cantilever 1 comes into contact with or approaches the sample 300, and the surface shape or the surface characteristic of the sample 300 is detected.

A laser beam is applied from a laser beam source 30 disposed above the base member 13, and the laser beam is applied to the rear surface of the cantilever 1 downward from an irradiation hole 13h penetrating the upper member of the base member 13 through a dichroic minor 31. The laser beam reflected from the cantilever 1 is reflected from a minor 32, and is detected by a displacement detector 5. The movement amount of the cantilever 1 in the vertical direction (z direction) is reflected on a change (incident position) of the optical path of the laser beam incident on the dichroic mirror 31. Accordingly, the displacement amount of the cantilever 1 from the incident position is detected by the displacement detector 5.

As stated above, the scanning probe microscope 200A according to the first illustrative embodiment adopts an optical lever type in which a positional deviation of the reflection light of the light incident on the cantilever 1 is detected as a displacement of the cantilever 1 (probe). The scanning probe microscope 200A is a scanning probe microscope of a lever type scanning type of performing measurement by scanning the cantilever attachment unit 101 to which the cantilever 1 is attached.

The probe microscope controller 24 includes a Z control circuit 20, a fine movement control circuit (X, Y, and Z output amplifiers) 22, a coarse movement control circuit 23, and a sensor controller 25, to be described below. The probe microscope controller 24 is capable of performing high-speed communication of data by being connected to the computer 40. The computer 40 controls the operation condition of a circuit within the probe microscope controller 24, performs input control of measured data, and realizes surface shape measurement, surface property measurement, frequency and vibration characteristics, and force curve measurement.

The scanner 111 causes the cantilever attachment unit 101 (and the cantilever 1) to three-dimensionally move (fine movement), and is a three-axis piezoelectric element that includes two (two-axis) piezoelectric elements 111a and 111b that scan the cantilever attachment unit 101 in an xy (plane of the sample 300) direction, and a piezoelectric element 111c that scans the cantilever attachment unit 101 in a z (height) direction.

The piezoelectric element is a sensor in which a crystal is deformed when an electric field is applied and an electric field is generated when the crystal is forcibly deformed due to an external force. The piezoelectric element may be generally made of lead zirconate titante (PZT) which is a kind of ceramics, but the material of the piezoelectric element is not limited thereto.

The piezoelectric elements 111a to 111c are connected to the fine movement control circuit 22, and predetermined control signals (voltages) are output to the fine movement control circuit 22. Thus, the piezoelectric elements 111a and 111b are driven in the xy direction, and the piezoelectric element 111c is driven in the z direction.

The three-dimensional coarse movement unit 122 causes the sample 300 to approach the cantilever 1 by coarsely three-dimensionally moving the sample stage 102, and includes an x stage 122a, a y stage 122b, and a z stage 122c. For example, the three-dimensional rough movement unit 122 is operated by driving a screw mechanism by a step motor, and is controlled by the rough movement control circuit 23.

As shown in FIG. 2, the cantilever attachment unit 101 has a substantially square pillar of which the front end surface is an inclined surface. The non-contact sensor 130 includes three non-contact sensors 130a to 130c, and the non-contact sensor 130a faces the cantilever attachment unit 101 from the rear surface (base member 13) of the cantilever attachment unit 101, and the non-contact sensors 130b and 130c face the cantilever attachment unit 101 from both side surfaces (paper surface direction of FIG. 1) of the cantilever attachment unit 101.

Meanwhile, detection surfaces 132a to 132c are respectively provided on the three surfaces of the cantilever attachment unit 101 that respectively face the non-contact sensors 130a to 130c.

The non-contact sensor 130a is attached to the front end of a stay 135a which is attached to the inner surface of a member that vertically extends in the leftward U-shaped part of the base member 13 and extends in the horizontal direction. The non-contact sensors 130b and 130c are attached to the front ends of stays 135b and 135c which are attached to the upper surface of the base member 13 and extend downward.

In the first illustrative embodiment, the detection surfaces 132a to 132c are diffraction gratings (volume type hologram gratings), and the non-contact sensors 130a to 130c are the corresponding laser displacement meters, and the detection surfaces 132a to 132c constitute a part of the "movement amount detecting means".

The laser displacement meter includes a photo detector that detects the laser beam diffracted by the volume type hologram grating, a polarized light beam splitter that splits the laser beam into S-polarized light and P-polarized light, and a mirror. The interference state of the laser beam is changed when the volume type hologram grating moves in one direction (one axis), and interfered light is contrasted according to one pitch of the grating. The displacement on one axis is detected.

Accordingly, as shown in FIG. 2, for example, by providing the detection surfaces 132a, 132b and 132c in the orientations in which the x, y, and z directions are detected, the displacements of the cantilever attachment unit 101 in the x, y and z directions are detected by the non-contact sensors 130a to 130c, as will be described below.

Next, the operation of the scanning probe microscope 200A will be described.

Firstly, the three-dimensional coarse movement unit 122 is operated, and the sample 300 approaches the cantilever 1 (probe) by coarsely three-dimensionally moving the sample stage 102. The positional relationship between the cantilever 1 and the sample 300 is adjusted by appropriately moving the scanner 111 in the xy direction, and an arbitrary location of the sample 300 is measured. The cantilever 1 is sent up to a position that comes into contact with the sample 300 in the z direction by the piezoelectric element 111c of the scanner 111.

As mentioned above, the probe of the cantilever 1 approaches or comes into contact with the sample 300, and in this case, the displacement of the cantilever 1 is detected in an optical lever manner, the scanner 111 scans the surface (xy) of the sample 300 while maintaining the displacement amount of the cantilever 1 in the height (z) direction to be constant. The property of the surface of the sample 300 is measured using a control signal for maintaining the displacement amount of the cantilever 1 to be constant, as property information.

When the displacement is detected in the optical lever manner, the amplitude of the electrical signal of the displacement detector 5 is converted into a direct current level signal by an AC-DC conversion mechanism 6, and is input to the Z control circuit 20. The Z control circuit 20 transmits the control signal to a z signal unit of the fine movement control circuit 22, such that the displacement amount of the cantilever 1 in the height (z) direction is maintained to be constant, and the z signal unit outputs a control signal (voltage) for driving the piezoelectric element 111c in the z direction. That is, the displacement of the cantilever 1 in the height direction (z) caused by an inter-atomic force acting between the sample 300 and the probe is detected by the aforementioned mechanism, and the piezoelectric element 111c is displaced such that the detected displacement becomes constant. In this state, the piezoelectric elements 111a and 111b are displaced in the xy direction by the fine movement control circuit 22 to scan the sample 300, and the property or shape of the surface is mapped.

Here, in the first illustrative embodiment, when the shape or property of the surface of the sample 300 is measured by the cantilever 1 in the scanning probe microscope 200A, the three-dimensional position of the cantilever attachment unit 101 is directly detected by the non-contact sensors 130a to 130c. The detection signals of the non-contact sensors 130a to 130c are sequentially obtained by the control unit 40 through the sensor controller 25, as an actual three-dimensional displacement amount when the shape or property of the surface is mapped. Based on the detection signals (information) obtained by the control unit 40, the three-dimensional shape of the sample surface is reconfigured. For this reason, the data such as the three-dimensional shape has higher accuracy without interference in the other direction than the three-dimensional displacement amount obtained based on the voltages applied to the piezoelectric elements 111a, 111b and 111c by the scanning probe microscope of the related art.

Thus, since the position of the cantilever 1 which is fixed to the cantilever attachment unit 101 and the position of the sample 300 that faces the cantilever 1 to come into contact with or approach the cantilever 1 can be accurately measured, positioning accuracy when the sample 300 is scanned by the cantilever 1 and measurement accuracy or resolution of the shape or property of the surface of the sample 300 are improved.

The movement (position) on the XY plane is achieved by adopting closed loop control based on the detection signals of the non-contact sensors 130a to 130c, and the movement while performing higher-accuracy positioning can be performed. Thus, it is possible to perform control of a small error in the positioning on the XY plane.

When the typical surface shape is observed in the present illustrative embodiment, since the movement (position) in the Z direction is simply achieved by directly reading the detection signals (sensor values), the closed loop control may not be performed. However, when it is necessary to control the movement amount in the Z direction as in the force curve measurement, the closed loop control based on the detection signal of the non-contact sensor 130c in the Z direction may be performed.

The closed loop control may be performed by the probe microscope controller 24 and the control unit 40. Alternatively, the closed loop control is known feedback control in which data related to the detection signal is fed back to the control unit 40.

In the present illustrative embodiment, the detection surfaces 132a to 132c are arranged on the respective three-dimensional axes, and the non-contact sensors 130a to 130c are provided for the detection surfaces 132a to 132c of the respective axes to detect the corresponding detection surfaces. Thus, the three-dimensional position of the cantilever attachment unit 101 at which the detection surfaces 132a to 132c are provided can be more accurately measured.

Figure 3:
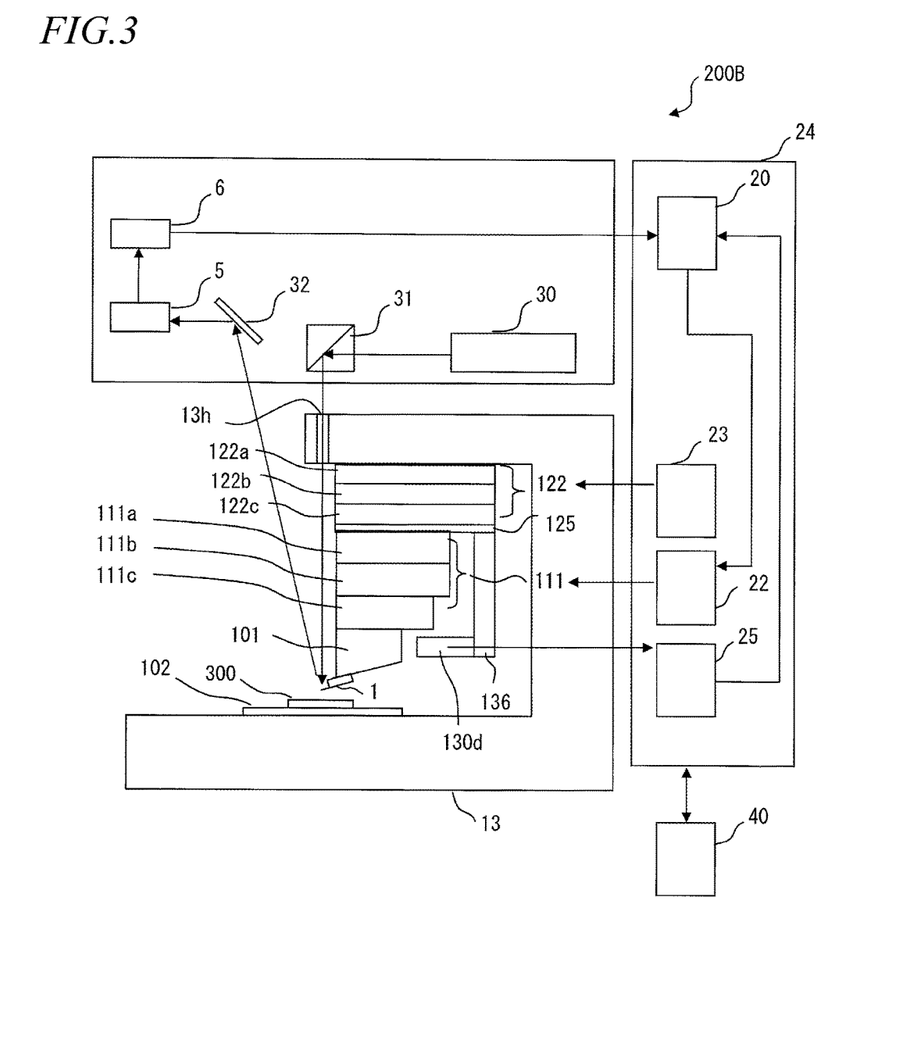
FIG. 3 is a block diagram of a three-dimensional fine movement device according to a second illustrative embodiment of the present invention.

FIG. 3 is a block diagram of a scanning probe microscope 200B according to a second illustrative embodiment of the present invention. The scanning probe microscope 200B is the same as the scanning probe microscope 200A according to the first illustrative embodiment except for the fact that the three-dimensional coarse movement unit 122 is provided between the scanner 111 and the base member 13, the sample stage 102 is directly fixed to the upper surface of the lower member of the leftward U-shaped part of the base member 13, and the attachment structure of the non-contact sensor 130d is different. Thus, the same components will be assigned the same reference numerals, and the description thereof will be omitted.

In the scanning probe microscope 200B, a coarse movement stage 125 is disposed between the three-dimensional coarse movement unit 122 and the scanner 111, and the coarse movement stage 125 is three-dimensionally displaced by the coarse movement of the three-dimensional coarse movement unit 122. The scanner 111 is fixed to a part of the lower surface of the coarse movement stage 125, and a stay 136 that extends downward is fixed to the surface of the coarse movement stage 125 to which the scanner 111 is not fixed. The non-contact sensor 130d facing the rear surface of the cantilever attachment unit 101 is attached to the front end of the stay 136.

In the second illustrative embodiment, only one non-contact sensor 130d is provided, and detects the displacement of the cantilever attachment unit 101 in the z direction. The non-contact sensor 130d is an electrostatic capacitance sensor, and the rear surface thereof is the detection surface since it is not necessary to provide the diffraction grating of the first illustrative embodiment as the detection surface on one surface (rear surface) of the cantilever attachment unit 101 facing the non-contact sensor 130d.

Here, as the sample 300 mounted on the three-dimensional coarse movement unit 122 is heavy, a three-dimensional coarse movement position tends to drift significantly due to the weight of the sample 300. Here, by attaching the three-dimensional coarse movement unit 122 to the cantilever attachment unit 101 opposite to the sample 300, the influence of the drifting is suppressed, and thus, it is possible to perform the three-dimensional coarse movement.

In the example of FIG. 3, all three axes (the x stage 122a, the y stage 122b, and the z stage 122c) of the three-dimensional coarse movement unit 122 are attached to the cantilever attachment unit 101. However, as shown in a scanning probe microscope 200C of FIG. 4, at least one axis of the three axes of the three-dimensional coarse movement unit 122 may be attached to the cantilever attachment unit 101. Particularly, since the drifting due to the weight of the sample 300 is remarkable in the vertical (z) direction, at least the z axis (z stage 122c) is preferably attached to the cantilever attachment unit 101. In this case, the two axes (the x stage 122a and the y stage 122b) of the three-dimensional coarse movement unit 122 are disposed between the sample stage 102 and the base member 13.

Figure 4:
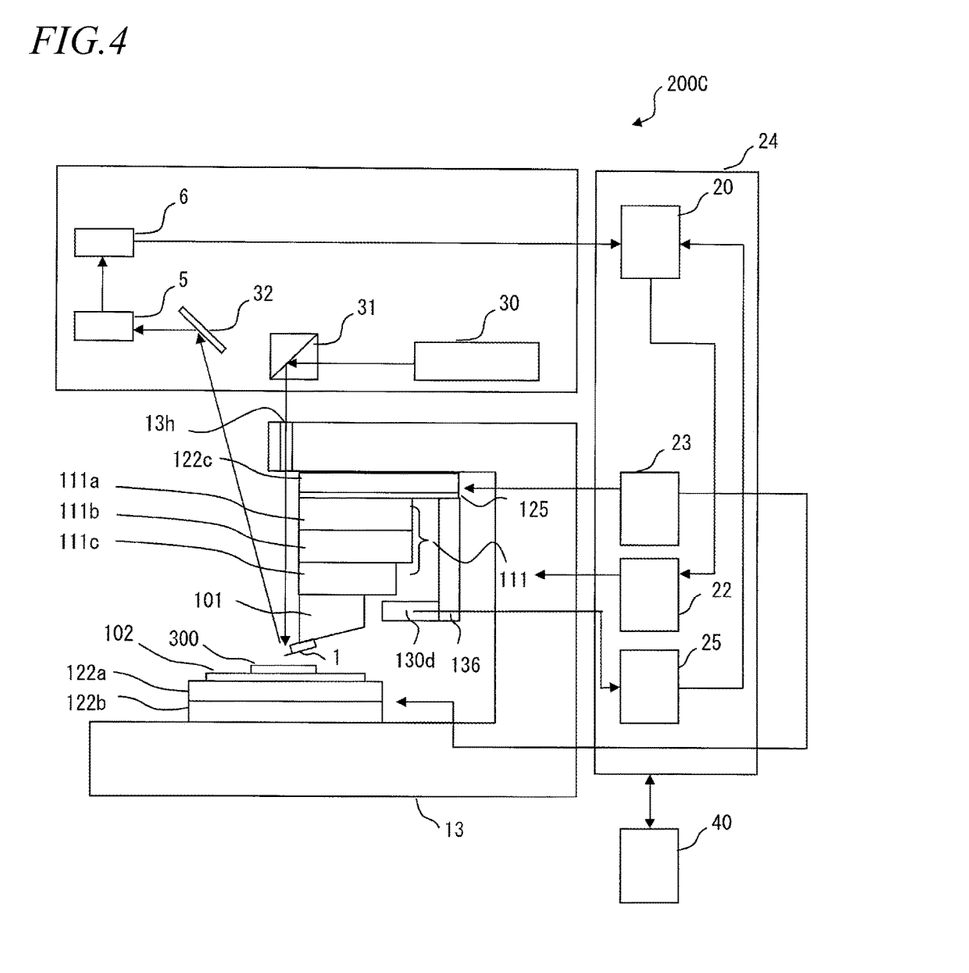
FIG. 4 is a block diagram showing a modification example of the three-dimensional fine movement device according to the second illustrative embodiment.

Here, in the scanning probe microscope 200C, the two axes (the x stage 122a and the y stage 122b) of the three-dimensional coarse movement unit 122 correspond to a "second three-dimensional coarse movement unit" in the claims.

Incidentally, when the three-dimensional coarse movement unit 122 is fixed to the base member 13 as in the second illustrative embodiment, if the non-contact sensor 130a is fixed to the base member 13, it is necessary to detect the position of the cantilever attachment unit 101 on the scanner 111 that is greatly displaced by the three-dimensional coarse movement unit 122. In this case, the position thereof exceeds the measurement range of the non-contact sensor 130a, and thus, it is difficult to detect the position thereof. Thus, by fixing the non-contact sensor 130a to the three-dimensional coarse movement unit 122, it is possible to accurately detect the displacement amount of the fine movement of the scanner 111 fixed to the three-dimensional coarse movement unit 122 without the influence of the displacement due to the three-dimensional coarse movement.

Similarly to the first illustrative embodiment, in the scanning probe microscope 200B according to the second illustrative embodiment, since the position of the cantilever 1 which is fixed to the cantilever attachment unit 101 and the position of the sample 300 that faces the cantilever 1 to come into contact with or approach the cantilever 1 can be also accurately measured, the positioning accuracy when the sample 300 is scanned by the cantilever 1 and the measurement accuracy or resolution of the shape or property of the surface of the sample 300 are improved.

Figure 5:
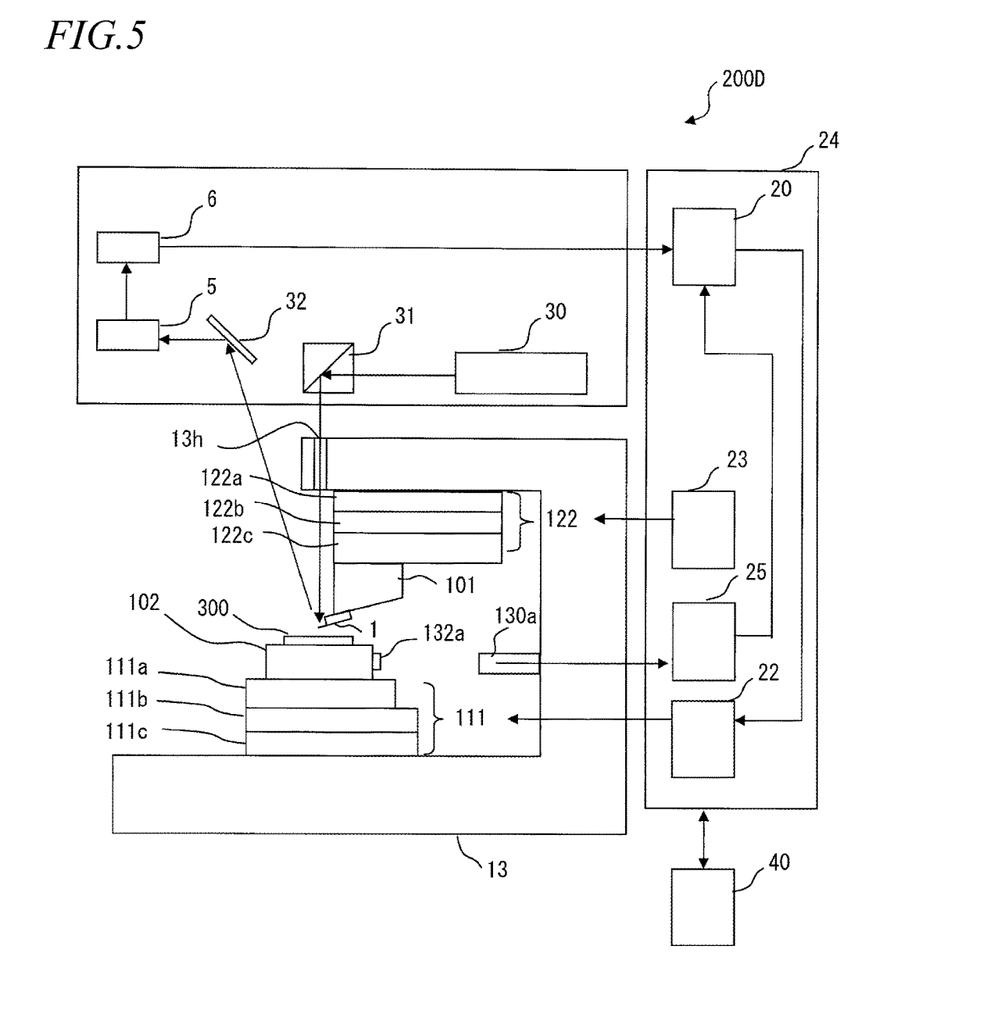
FIG. 5 is a block diagram of a three-dimensional fine movement device according to a third illustrative embodiment of the present invention.

FIG. 5 is a block diagram of a scanning probe microscope 200D according to a third illustrative embodiment of the present invention. The scanning probe microscope 200D is the same as the scanning probe microscope 200A according to the first illustrative embodiment except for the fact that the scanner 111 is disposed between the sample stage 102 and the base member 13 and the attachment structure of the non-contact sensor 130a is different. Thus, the same components will be assigned the same reference numerals, and the description thereof will be omitted.

As mentioned above, the scanning probe microscope 200D according to the present illustrative embodiment is a scanning probe microscope of a sample scanning type that performs the measurement by scanning the sample stage 102 onto which the sample 300 is mounted.

In the scanning probe microscope 200D, the non-contact sensor 130a facing the rear surface of the sample stage 102 is attached to the inner surface of the member of the leftward U-shaped part of the base member 13 that extends in the vertical direction. The non-contact sensor 130a is configured to detect the displacement of the sample stage 102 in the z direction. The non-contact sensor 130a is the same laser displacement meter as that of the first illustrative embodiment, and the detection surface 132a including the diffraction grating is provided on one surface (rear surface) of the sample stage 102 facing the non-contact sensor 130a.

Here, in the scanning probe microscope 200D, the sample 300 and the sample stage 102 respectively correspond to a "moving body" and a "fixation member" in the claims.

The scanning probe microscope 200D is the same optical lever type as that of the first illustrative embodiment, and scans the surface (xy) of the sample 300 while maintaining the displacement amount of the cantilever 1 in the height (z) direction by detecting the displacement of the cantilever 1 (probe) and controlling the height of the sample stage 102 by operating the scanner 111.

The present invention is not limited to the aforementioned illustrative embodiments. The moving body is not limited to the cantilever or the sample, and may include, for example, a probe (indenter) terminal used for an IC test, cutting tools (a drill of a drill press, built-in test equipment (BITE) on a lathe, an end mill of a milling machine, and a cutter on an NC lathe) in precise machining, or a pipette used in a patch clamp system (manipulator). Of the above mentioned, since the probe is very thin, the position thereof is difficult to be directly measured by the sensor. Since the drill or the end mill is rotated, the position thereof is difficult to be directly measured by the sensor. Since the BITE is worn through the machining, even if the position thereof is directly measured by the sensor, the measured value is not accurate. Since the thickness of a pipette has a thin diameter of about 10 μm or is a disposable type that is replaced after use, even if it is attempted to directly measure the position thereof by the sensor, since it is necessary to adjust the initial position of the sensor whenever the pipette is replaced, the pipette is difficult to be measured. As stated above, by measuring the fixation member to which the moving body is fixed, it is possible to avoid the aforementioned problems.

The movement amount detecting means is not limited to the aforementioned means, and may be a sensor that uses electrostatic capacitance, optical interference or optical diffraction, an optical sensor including an optical fiber and an optical interferometer, or an electrical sensor such as a strain gauge. The sensor that uses the electrostatic capacitance, the optical interference or the diffraction grating is preferably used due to high detection accuracy. The non-contact sensor 130 is not particularly limited.

Any movement amount detecting means may be used as long as it can detect the movement amount of the fixation member in at least the one direction (one axis).

When the three-dimensional fine movement device according to the present invention is applied to the scanning probe microscope, in the aforementioned examples, the three-dimensional shaped image is measured from the height displacement of the sample by maintaining the displacement amount between the sample and the cantilever in the height (z) direction to be constant. However, (ii) a phase image from the phase value in the resonance state, (iii) an error signal image due to a difference with respect to a target value of the vibration amplitude, and (iv) a multi-functional measurement image from the property between the probe and the sample may be measured. In addition, frequency and vibration characteristics may be measured.

What is claimed is:
1. A scanning probe microscope having a three-dimensional fine movement device, the three-dimensional fine movement device comprising:
   a moving body comprising a cantilever;
   a fixation member to which the moving body is fixed, the fixation member comprising a cantilever attachment unit, a diffraction grating being attached to the cantilever attachment unit;

a three-dimensional fine movement unit comprising a piezoelectric three-axis scanner having a plurality of piezoelectric elements including a first piezoelectric element configured to linearly move the scanner in an X direction independently of a Z direction, a second piezoelectric element configured to linearly move the scanner in a Y direction independently of the Z direction, and a third piezoelectric element configured to linearly move the scanner in the Z direction independently of the X and Y directions, wherein the fixation member is fixed to the three-dimensional fine movement unit, and wherein the three-dimensional fine movement unit allows for the three-dimensional fine movement of the moving body with the fixation member interposed therebetween in the Z direction orthogonal to an X-Y plane defined by the X and Y directions, wherein the piezoelectric scanner is configured to move the moving body in the X-Y plane independently of moving the moving body along the Z direction;

a three-dimensional coarse movement unit comprising another scanner different from the piezoelectric three-axis scanner, three-dimensional coarse movement unit comprising an X-component coarse movement unit, a Y-component coarse movement unit, and a Z-component coarse movement unit, wherein the three-dimensional fine movement unit is directly fixed to the Z-component coarse movement unit, and the three-dimensional coarse movement unit providing coarse movement of the three-dimensional fine movement unit on at least one axis of three-dimensional axes at a movement amount greater than that of the three-dimensional fine movement unit;

a base member to which the three-dimensional coarse movement unit is fixed, wherein the three-dimensional fine movement unit is disposed between the Z-component coarse movement unit and both of the X-component coarse movement unit and Y-component coarse movement unit in the Z direction, and wherein the three-dimensional fine movement unit is fixed to the base member via the Z-component coarse movement unit; and a movement amount detector that is fixed to the Z-component coarse movement unit of the three-dimensional coarse movement unit, the movement amount detector being configured to detect a movement amount of the fixation member, the movement amount detector comprising a non-contact optical sensor configured to detect the diffraction grating, wherein the non-contact optical sensor is disposed facing a side face of the fixation member, the fixation member being configured to move independently of and relative to the non-contact optical sensor in each of the three dimensions.

2. The three-dimensional fine movement device according to claim 1,
wherein the movement amount detector is configured to detect a plurality of detection surfaces of the fixation member,
wherein each of the plurality of detection surfaces is arranged on a respective axis of the three dimensions, and a respective diffraction grating is provided on the respective detection surface on each respective axis to detect the corresponding detection surface.

3. The three-dimensional fine movement device according to claim 1,
wherein the cantilever is configured to come into contact with or approach a sample,
wherein the three-dimensional fine movement device further comprises a sample stage that is fixed to the base member with X-component coarse movement unit and Y-component coarse movement unit interposed therebetween in the Z direction, and faces the cantilever,
wherein the Z-component coarse movement unit is disposed on an opposite side of the sample stage, in the Z direction, relative to the X-component coarse movement unit and Y-component coarse movement unit, and
wherein the sample is disposed on a surface of the sample stage.

4. The three-dimensional fine movement device according to claim 3,
wherein the three-dimensional coarse movement unit moves coarsely on an axis that is different from an axis onto which the three-dimensional coarse movement unit moves coarsely.

5. The three-dimensional fine movement device according to claim 1, further comprising:
a control device configured to perform control on a position on at least one axis of three-dimensional positions of the moving body through closed loop control based on the movement amount detected by the movement amount detector.

* * * * *